United States Patent [19]

Haentjens

[11] Patent Number: 4,854,828

[45] Date of Patent: Aug. 8, 1989

[54] REMOTELY REMOVABLE AND REPLACEABLE MOTOR FOR HAZARDOUS SERVICE PUMP INSTALLATION

[76] Inventor: Walter D. Haentjens, R.D. 1, Box 121, Sugarloaf, Pa. 18249

[21] Appl. No.: 868,605

[22] Filed: May 30, 1986

[51] Int. Cl.⁴ .............................................. F04B 9/02
[52] U.S. Cl. ................................. 417/360; 417/424.1
[58] Field of Search ................ 417/359, 360, 424; 403/300, 306; 411/531; 376/260

[56] References Cited

U.S. PATENT DOCUMENTS

| | | | |
|---|---|---|---|
| 2,435,470 | 6/1944 | Samelson | 417/424 X |
| 2,639,789 | 5/1953 | Rosenberg | 411/531 X |
| 2,694,157 | 9/1948 | Cone | 417/424 X |
| 3,199,745 | 8/1965 | Hollis et al. | 417/360 X |

Primary Examiner—Leonard E. Smith
Assistant Examiner—Eugene L. Szczecina, Jr.

[57] ABSTRACT

A vertical pump driven by a motor having a construction which permits removal and replacement of the motor by remotely controlled equipment. The motor frame is secured to the pump with hold down bolts and the motor shaft is connected to the pump shaft by a unique, tapered coupling arrangement in which a motor coupling half is rigidly secured to a pump coupling half with a drawbar. The motor shaft is hollow and the drawbar extends through the hollow shaft drawing the coupling halves firmly together. The drawbar and hold down bolts are arranged to be selectively loosened or tightened by a remotely operated nut runner.

10 Claims, 3 Drawing Sheets

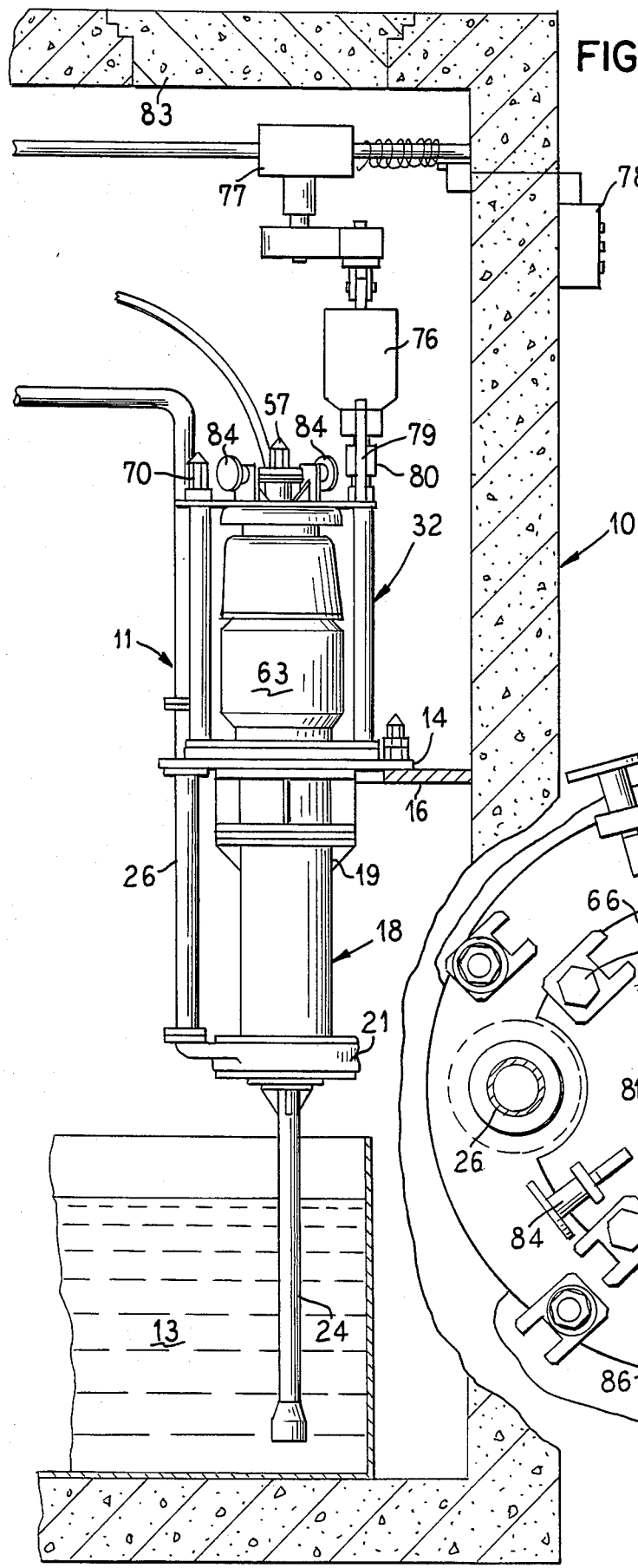

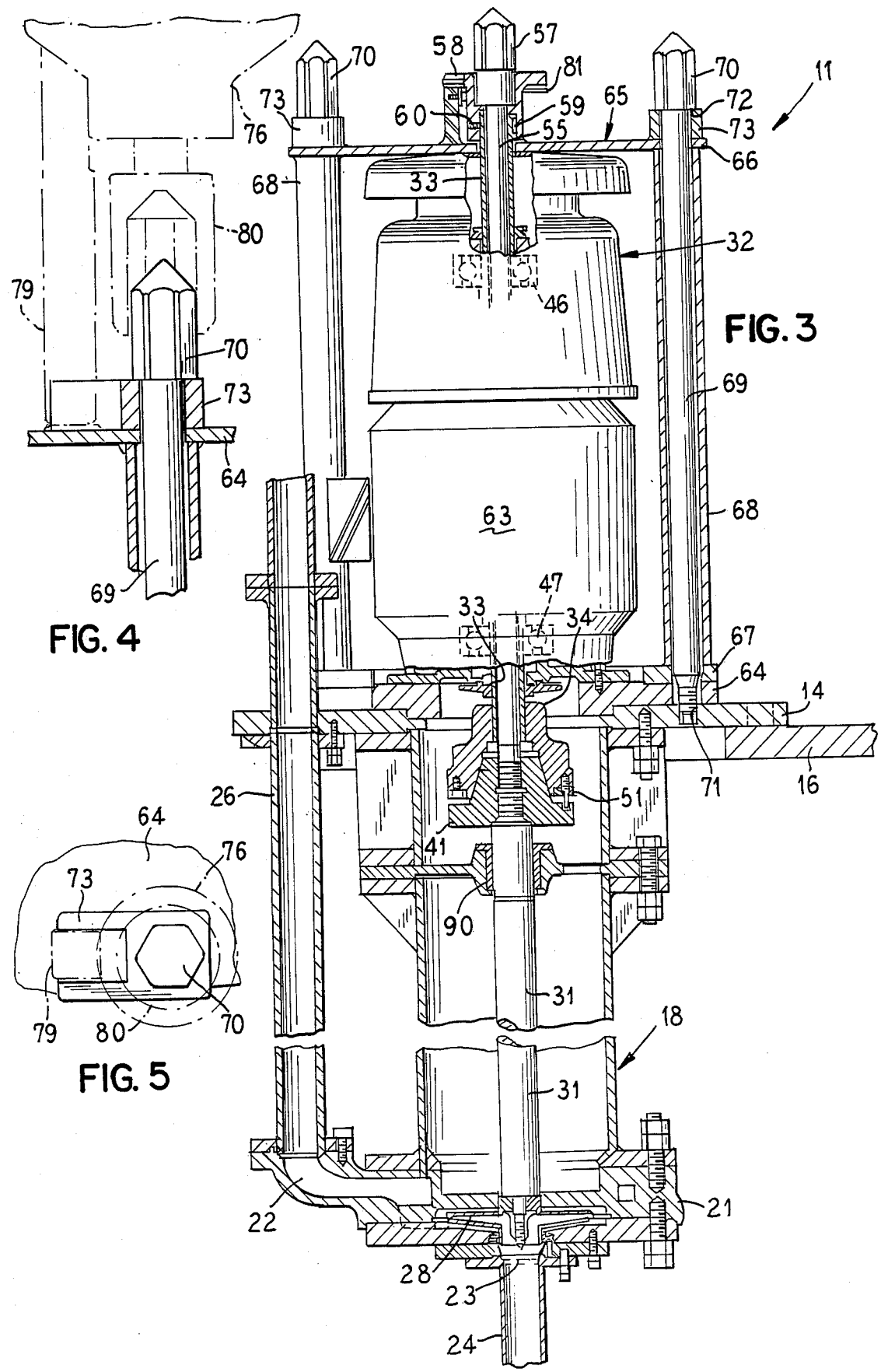

4,854,828

REMOTELY REMOVABLE AND REPLACEABLE MOTOR FOR HAZARDOUS SERVICE PUMP INSTALLATION

BACKGROUND OF THE INVENTION

1. Field of the Invention

The present inventions relates to pump assemblies utilized in very hazardous installations such as nuclear processing plants or the like and more particularly to pump assemblies in which installation and removal of the drive motor for the pump must be made by remotely operated equipment.

2. Description of the Prior Art

Pump assemblies which are installed in nuclear processing plants to handle solutions or slurries of very highly radioactive materials are often serviced by remote techniques. The cost of this type of maintenance is large and difficult to perform. Even for those plants where radiation is not as severe and maintenance could be performed by direct methods, the initial capital cost may be reduced, but these savings may be offset to a large extent by increased costs related to decontamination and limited permissible working time of maintenance personnel.

In plants for nuclear fuel reprocessing or the like the pump assemblies are installed with remote handling equipment into so-called "canyon" areas where the radiation levels are so high that no one may enter. It is therefore impossible to relubricate or service a conventional pump once it has been installed and placed in service.

The weakest areas of these pump/motor assemblies resides in the deterioration of the lubricant in the pump and motor bearings and the deterioration of the motor insulation due to radiation. Accordingly, a pump/motor assembly which can be serviced by a simple remote arrangement would be a decided advance in the state of the art.

SUMMARY OF THE INVENTION

This invention provides a vertical pump/motor assembly which has only one set of bearings, namely those of the motor, and which makes provision for the removal of the motor from the assembly without removing the pump unit. The entire procedure is accomplished by remotely operated equipment which is controlled from the safety of a suitably shielded location.

The pump unit is of a vertical shaft design having a cantilevered shaft so as to avoid the necessity of submerged bearings as well as eliminating the need to replace pump bearings. A special tapered coupling provides a rigid and aligned connection between the pump shaft and a hollow motor shaft. An elongated drawbar is employed to secure a motor half of the coupling to a pump shaft coupling half. The drawbar has threaded engagement with the pump coupling half and extends through the hollow motor shaft with a hex head portion of the drawbar protruding above the motor, whereby a tightening and loosening device, or nut runner, may be positioned from a remote location to rotate the drawbar. A slotted disc which is fixed to the hollow motor shaft provides engagement for an arm protruding from the nut runner, whereby torque may be applied to the hex head to rotate the drawbar in a tightening or loosening direction.

The motor unit is secured to the pump unit by four motor hold down bolts, each having a hex head similar to the drawbar and being tightened or loosened by the same nut runner device as used with the drawbar. A restraining block provides a similar torque transmitting function for each of the hold down bolts as the restraining sleeve provides for the drawbar.

After the motor hold down bolts and drawbar have been unthreaded from the pump frame and from the pump coupling half the entire motor unit may be lifted as a unit from the pump assembly and removed from the shielded processing chamber for repair by way of a temporary access opening by a suitable hoist or the like. A replacement motor unit may thereafter be installed in the chamber by lowering the motor unit into a required position relative to the pump unit after which the hold down bolts and drawbar are tightened by the remotely controlled nut runner to secure the motor firmly to the pump assembly and thereafter tighten down the drawbar into the pump half coupling to secure the motor shaft to the pump shaft.

It is therefore an object of the present invention to provide a vertical pump/motor installation for operation in an area of high radiation and which will permit the removal and replacement of the motor from the area by a remotely controlled device.

It is a more specific object of the present invention to provide a vertical pump/motor assembly arranged for operation in an area exposed to high radiation levels in which the motor shaft and pump shaft are drivably connected by paired coupling members which are secured together by a drawbar which can be assembled or dismantled by a remotely controlled device whereby the motor can be removed from the area as a unit.

It is a further object of the present invention to provide a vertical pump/motor assembly in which the motor frame is secured to the pump unit by hold down bolts and which may be tightened or loosened from a location at the top of the motor frame which location is accessible to a remotely controlled device whereby the motor unit may be detached and removed from the pump unit.

Other objects, features and advantages of the invention will be readily apparent from the following description of a preferred embodiment thereof, taken in conjunction with the accompanying drawings.

BRIEF DESCRIPTION OF THE DRAWINGS

FIG. 1 is a fragmentary vertical sectional view of a nuclear processing arrangement utilizing a pump/motor assembly constructed and installed in accordance with the principles of the present invention;

FIG. 2 is a top plan view of the pump/motor assembly shown in FIG. 1;

FIG. 3 is an enlarged vertical sectional view of the pump/motor assembly shown in FIG. 1;

FIG. 4 is an enlarged fragmentary sectional view taken generally along the line IV—IV of FIG. 2 and showing the nut runner device in broken lines and being in position to loosen one of the hold down bolts;

FIG. 5 is a plan view of the slotted plate and hold down bolt shown in FIG. 4;

FIG. 7 is a fragmentary sectional view showing the coupling members in operating engagement.

DETAILED DESCRIPTION OF THE PREFERRED EMBODIMENT

Figure 6:
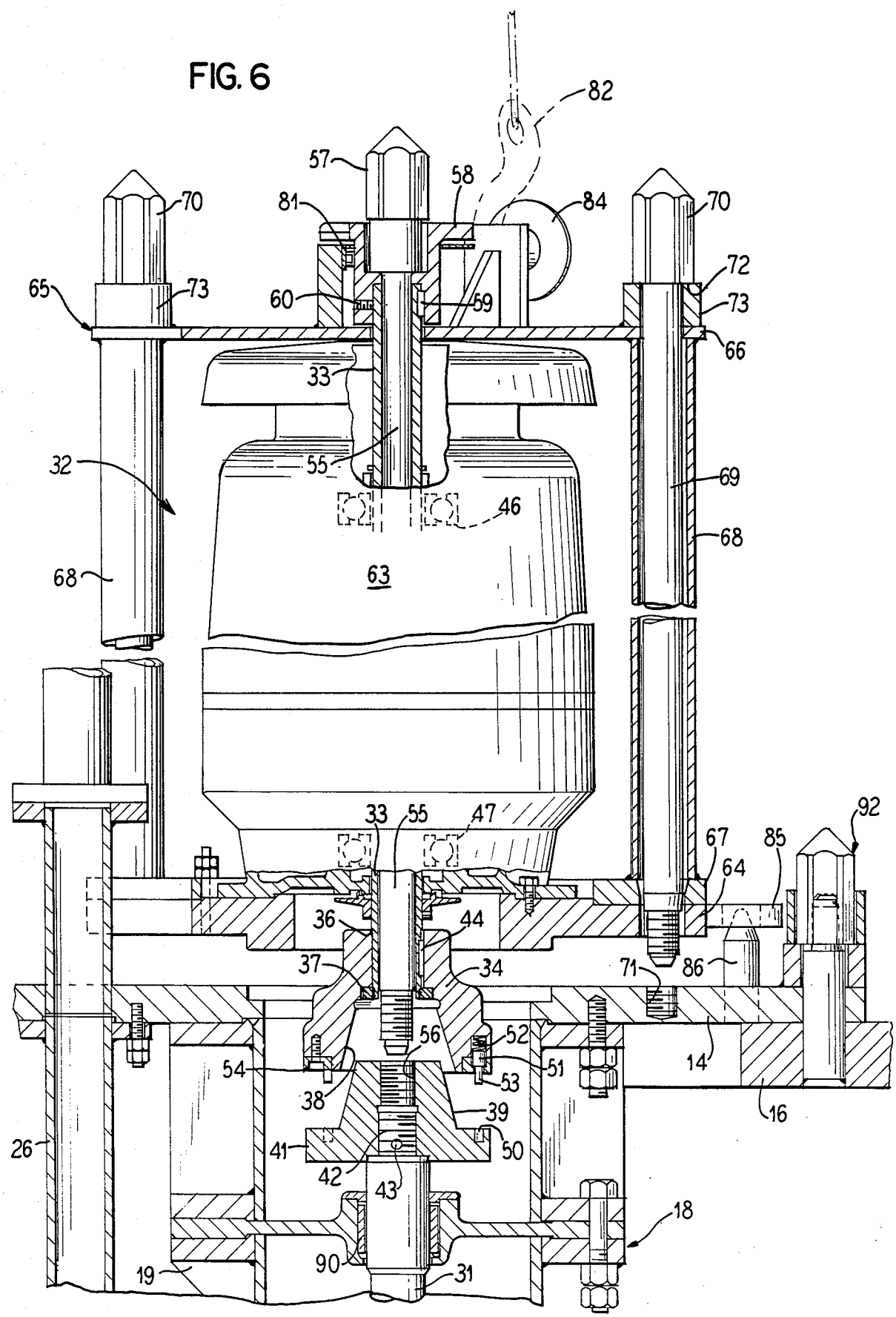
FIG. 6 is an enlarged fragmentary sectional view similar to FIG. 3, but showing the motor unit being separated from the pump unit.

In FIG. 1, there is shown a portion of a nuclear processing plant including an enclosed processing chamber or "canyon" area 10 having thick, reinforced walls of high density concrete to protect the operating personnel from radiation. Operation of the plant and maintenance of the equipment in the high radiation zones must be conducted by remote techniques. Herein, a unique vertical pump/motor assembly 11 is installed in the processing chamber 10 to pump solutions or slurries 13 of highly radioactive material. The pump/motor assembly 11 is mounted on a base plate 14, which is bolted to a support frame 16 in the processing chamber 10.

A vertical shaft pump unit 18 includes a supporting frame 19 and pump housing or casing 21 having a discharge outlet 22 and an inlet opening 23. A suction tailpipe 24 extends downwardly from the inlet opening 23 into the solution 13 and a discharge pipe 26 extends upward from the discharge opening 22 to a processing unit or the like (not shown). An impeller 28 is positioned in the housing 21 and is affixed to the lower end of a pump shaft 31. The specific arrangement of the pumping components may be of any suitable construction but essentially follow the design principles and features of my U.S. Pat. No. 3,066,612. The pump shaft 31 is driven by an electric motor unit 32 through a hollow motor shaft 33 which has a motor half coupling 34 attached thereto by a shrink fit and the coupling 34 is retained on the shaft 33 between a shoulder 36 and a nut 37 as shown in FIGS. 6 and 7 of the drawings. In certain circumstances a hydraulic motor may be used in place of the electric motor 63 in the motor unit assembly 32.

The motor half coupling 34 has an accurately machined tapered bore 38 which mates with a precision tapered surface 39 of a pump half coupling 41. The pump half coupling 41 is carried on a threaded portion 42 on the upper end of the pump shaft 31 and is preferably pinned thereto by a connecting pin 43 to prevent loosening. Further, the motor half coupling 34 is preferably keyed to the motor shaft 33 by a key 44.

This tapered interconnection between the motor half coupling 34 and the pump half coupling 41 provides alignment and rigididity for the pump shaft 31 which is cantilevered below the coupling members. Herein, motor shaft bearing 46 and 47 provide the only bearing support for motor shaft/pump shaft assembly which, thus, avoids the necessity of using submerged bearing for the pump shaft.

A positive drive connection between the coupling halves is provided by a plurality of retractable pins 51 which normally extend downward from the motor half coupling and into mating recesses 50 in the pump half coupling 41. These pins are arranged to handle maximum shear loads generally associated with starting torque of the motor 63. Springs 52 are carried in aperatures in the motor half coupling 34 to bias the pins 51 downward whereby a reduced diameter end portion 53 extends through a retaining ring 54 for driving engagement with bores 50 in the pump half coupling 41 as best seen in FIG. 7.

Pump half coupling 41 is held tightly seated in the tapered bore 38 of the motor half coupling 34 by a threaded drawbar 55 which extends through the hollow motor shaft 33 and into engagement with a threaded bore 56 in the pump coupling 41. An elongated hex head portion 57 of the drawbar 55 protrudes above a slotted restraining sleeve 58 which is secured as with a key 59 and set screw 60 to the top end of the hollow motor shaft 33.

The motor unit 32 includes an electric motor 63 which is mounted to a sub-baseplate 64 by machine screws or the like and also includes a top plate 66 and a bottom plate 67 which are interconnected by a plurality of tube members 68 (as best seen in FIG. 3) with the bottom plate 67 securely attached to the sub-baseplate 64. This assembly comprises a lifting frame 65 by which means the entire electric motor unit 32 may be hoisted from the processing chamber 10.

A hold-down bolt 69 extends down through each of the tube members 68 and is turned down into a threaded bore 71 of the baseplate 14 to secure the motor unit 32 in assembly with the pump unit 18. Each of the hold down bolts is provided with a hex head portion 70, similar to the head portion 57 of the drawbar 55, and having a shoulder 72 thereon arranged to bear down on an abutting surface of a slotted plate 73 which is welded to the top plate 66.

In the event of a failure of the motor bearings 46, 47 or an electrical failure of the motor, the motor unit 32 along with the motor half coupling 34 can be removed by remote operated equipment. Herein, the coupling members 34 and 41 are separated by means of a remotely supported and operated tightening and loosening machine or nut runner 76. The nut runner is of a conventional design and may be positioned by any suitable remotely controlled device 77 from a shielded control location 78. Herein, a protruding arm 79 of the nut runner is seated in a slot of the restraining sleeve 58 while at the same time, a drive socket 80 of the nut runner is lowered over the hex head portion 57 whereby all the torque is transmitted to the drawbar 55 without rotation of the hollow motor shaft 33. Thus, the threaded end of the drawbar 55 is unthreaded from the bore 56 of the pump half coupling 41. The weight of the nut runner 76 forces disengagement of the taper fit between the motor half coupling 34 and the pump half coupling 41, however, the separation between the coupling members will be relatively small because of the limited downward axial displacement available to the pump shaft impeller assembly in the pump housing 21. Herein, the drive pins 51 remain at least in partial engagement with the bores 50 to insure complete disengagement of the drawbar 55 from the threaded bore 56 of the pump half coupling 41. A stop plate 81 is provided to facilitate locating the protruding arm 79 of the nut runner 76 relative to a cooperating slot in the restraining sleeve 58.

Similarly, the nut runner 76 is brought into engagement with the hex head portion 70 of the hold down bolts 69 and with the protruding arm 79 engaging a cooperating slot in the plate 73 to rotatably unscrew the hold down bolts from the base plate 14.

Now with all of the hold down bolts 69 unthreaded from the bores 71 and with the draw bar 55 free of the bore 56, a remotely controlled crane or hoist 82 can then be used to lift the entire motor unit, together with the motor half coupling from the processing chamber 10 through a temporary access opening 83 as seen in FIG. 1. A pair of lifting lugs 84 are provided on the lifting frame 65 to facilitate removal of the motor unit 32. A replacement duplicate motor unit can then be installed by generally reversing the above procedure. However, preferably a pair of diametrically spaced ears 85 are welded to the sub-baseplate 64 each having a hole therein and arranged to cooperate with a pair of locating dowel pins 86 whereby the threaded ends of the hold down bolts 69 are brought into vertical alignment with the threaded holes 71 in the base plate 14.

During reassembly of the motor unit, it is not necessary to have any exact angular relationship between the pump half and motor half couplings since the drive pins 51 will recess into the motor half coupling 34 by virtue of the springs 52. When the pump is started, any relative motion between the pump and motor half couplings will progress only to the point where the springs force engagement of the driving pins 51 into the bores 50 provided in the pump half coupling 41.

While the unit is disassembled and awaiting the installation of a replacement motor unit, the pump shaft 31 is held in generally vertical alignment by a bushing 90. There is a small clearance between the bushing 90 and the pump shaft 31 so that there is no contact during normal pumping operation but the bushing insures that the pump shaft will remain in a recoupling orientation while awaiting the mating of the tapered surfaces 38, 39 of the coupling halves to reestablish exact alignment for the pump shaft 31.

In some instances, it may be desirable to utilize a somewhat similar arrangement in order that the pump unit 18 together with the baseplate 14 may be removed from the processing chamber 10 for replacement or servicing. Herein, the baseplate is provided with a hold down arrangement generally designated as 92 which may also permit easy removal of the pump unit with the aid of a nut runner and crane arrangement in a manner as generally described above.

The details of construction of the processing chamber and of the remotely controlled nut runner form no part of the present invention, but may be of any suitable commercial design.

It will be apparent that various modifications and additions may be made in the apparatus described above, without departing from the essential features of novelty thereof, and it should be understood that I wish to embody within the scope of the patent warranted herein all such modifications and additions as reasonably and properly come within the scope of my contribution to the art.

I claim as my invention:

1. A vertical pump/motor assembly adapted for service in a hazardous environment in which replacement of a motor unit is performed by remotely operated equipment, comprising:
   a pump unit operably mounted in said hazardous environment and having a pump shaft with a first precision coupling half secured to an upper end thereof,
   said first coupling half includes a tapered conical projection;
   a motor unit supported on said pump unit and having a lifting frame supporting a motor therein, said motor being equipped with a hollow motor shaft and having a second precision coupling half secured to a lower end thereof, wherein said second coupling half includes a self-aligning tapered bore therein, said tapered bore and said tapered conical projection are adapted for precision mating and releasable interconnection;
   a pair of bearings rotatably supports said hollow motor shaft in said motor wherein said pump shaft is cantilevered below said motor in a rigid and aligned orientation by means of said first and second coupling halves;
   an elongated drawbar extending through said hollow motor shaft and being engageable with said first coupling half whereby said first and second coupling halves are rigidly held together in a driving relationship, said drawbar having a torque transmitting head protruding above said hollow motor shaft and being accessible, whereby said remotely operated equipment may be employed to rotate said drawbar to selectively connect or disconnect said first and second coupling halves;
   a plurality of elongated hold down bolts arranged to secure said lifting frame to said pump unit, each hold down bolt having a torque transmitting head portion protruding from said lifting frame and being accessible, whereby said remotely operated equipment may not be employed to selectively tighten down or release said motor unit from said pump unit for replacement of said motor unit in said hazardous environment;
   said drive pin means being extensible from one of said coupling halves and is engageable with bore means in the other of said coupling halves so that positive driving between said coupling halves is provided;
   said drive pin means including a plurality of spaced drive pins, each being biased by a spring into engagement with a related bore of said bore means whereby exact rotational relationship between coupling halves is unnecessary when replacing said motor unit and said drive pins will automatically seat in said related bores upon initial relative motion between the coupling halves;
   said pump shaft being maintained in an aligned vertical orientation by a bushing while awaiting the mating of said coupling halves, and
   said bushing having a small clearance relative to said pump shaft when said coupling halves are rigidly interconnected.

2. A vertical pump/motor assembly adapted for service in a hazardous environment in which replacement of a motor unit is performed by remotely operated equipment, comprising:
   a pump unit operably mounted in said hazardous environment and having a pump shaft with a first precision coupling half secured to an upper end thereof,
   said first coupling half includes a tapered conical projection;
   a motor unit supported on said pump unit and having a lifting frame supporting a motor therein, said motor being equipped with a hollow motor shaft and having a second precision coupling half secured to a lower end thereof, wherein said second coupling half includes a self-aligning tapered bore therein, said tapered bore and said tapered conical projection are adapted for precise mating and releasable interconnection;
   a pair of bearings rotatably supports said hollow motor shaft in said motor and wherein said pump shaft is cantilevered below said motor in a rigid and aligned orientation by means of said first and second coupling halves;
   an elongated drawbar extending through said hollow motor shaft and being engageable with said first coupling half whereby said first and second coupling halves are rigidly held together in a driving relationship, said drawbar having a torque transmitting head protruding above said hollow motor shaft and being accessible, whereby said remotely operated equipment may be employed to rotate said drawbar to selectively connect or disconnect said first and second coupling halves;

a plurality of elongated hold down bolts arranged to secure said lifting frame to said pump unit, each hold down bolt having a torque transmitting head portion protruding from said lifting frame and being accessible, whereby said remotely operated equipment may be employed to selectively tighten down or release said motor unit from said pump unit for replacement of said motor unit in said hazardous environment;

said pump unit being operably mounted in said hazardous environment on a base plate, and said lifting frame including a top plate and a bottom plate being interconnected by a plurality of tube members through which said plurality of elongated hold down bolts extend and are turned down into related threaded bores in said base plate to operably secure said motor lifting frame to said pump unit.

3. The vertical pump/motor assembly of claim 2, wherein said lifting frame further includes a sub-base plate secured to said bottom plate and having a pair of spaced, perforated ears secured thereto, and wherein said base plate includes a pair of spaced, upward extending locating pins arranged to be received in the perforations of said ears, whereby said plurality of elongated hold down bolts are placed in register with said related threaded bores in said base plate.

4. A vertical pump/motor assembly adapted for service in a hazardous environment in which replacement of a motor unit is performed by remotely operated equipment, comprising:

a pump unit operably mounted in said hazardous environment and having a pump shaft with a first precision coupling half secured to an upper end thereof, said first coupling half includes a tapered conical projection;

a motor unit supported on said pump unit and having a lifting frame supporting a motor therein, said motor being equipped with a hollow motor shaft and having a second precision coupling half secured to a lower end thereof, wherein said second coupling half includes a self-aligning tapered bore therein, said tapered bore and said tapered conical projection are adapted for precise mating and releasable interconnection;

a pair of bearings rotatably supports said hollow motor shaft in said motor and wherein said pump shaft is cantilevered below said motor in a rigid and aligned orientation by means of said first and second coupling halves;

an elongated drawbar extending through said hollow motor shaft and being engageable with said first coupling half whereby said first and second coupling halves are rigidly held together in a driving relationship, said drawbar having a torque transmitting head protruding above said hollow motor shaft and being accessible, whereby said remotely operated equipment may be employed to rotate said drawbar to selectively connect or disconnect said first and second coupling halves;

a plurality of elongated hold down bolts arranged to secure said lifting frame to said pump unit, each hold down bolt having a torque transmitting head portion protruding from said lifting frame and being accessible, whereby said remotely operated equipment may be employed to selectively tighten down or release said motor unit from said pump unit for replacement of said motor unit in said hazardous environment; and said hollow motor shaft including a slotted disc secured to an upper end thereof and being adapted to coact with said torque transmitting head of said drawbar whereby said remotely operated equipment is effective to apply full torque thereto selectively to tighten down said drawbar into said first coupling half.

5. A vertical pump/motor assembly adapted for service in a hazardous environment in which replacement of a motor unit is performed by remotely operated equipment, comprising:

a pump unit operably mounted in said hazardous environment and having a pump shaft with a first precision coupling half secured to an upper end thereof, said first coupling half includes a tapered conical projection;

a motor unit supported on said pump unit and having a lifting frame supporting a motor therein, said motor being equipped with a hollow motor shaft and having a second precision coupling half secured to a lower end thereof, wherein said second coupling half includes a self-aligning tapered bore therein, said tapered bore and said tapered conical projection are adapted for precise mating and releasable interconnection;

a pair of bearings rotatably supports said hollow motor shaft in said motor and wherein said pump shaft is cantilevered below said motor in a rigid and aligned orientation by means of said first and second coupling halves;

an elongated drawbar extending through said hollow motor shaft and being engageable with said first coupling half whereby said first and second coupling halves are rigidly held together in a driving relationship, said drawbar having a torque transmitting head protruding above said hollow shaft and being accessible, whereby said remotely operated equipment may be employed to rotate said drawbar to selectively connect or disconnect said first and second halves;

a plurality of elongated hold down bolts arranged to secure said lifting frame to said pump unit, each hold down bolt having a torque transmitting head portion protruding from said lifting frame and being accessible whereby said remotely operated equipment may be employed to selectively tighten down or release said motor unit from said pump unit for replacement of said motor unit in said hazardous environment; and a slotted plate being operably associated with each of said plurality of hold down bolts and being adapted to coact with said torque transmitting head of said hold down bolts whereby said remotely operated equipment is effective to apply full torque thereto to selectively tighten down said motor unit to said pump unit or release said motor unit from said pump unit.

6. A pump/motor assembly arranged to operate in an area of high radiation in which the motor portion of the assembly is replaceable with the use of remotely operated equipment, comprising:
- a pump unit mounted in said area on a first surface of a base plate and including a pump shaft;
- a motor unit having a frame carrying a motor thereon and being mounted on a second surface of said base plate, said motor having a hollow motor shaft;
- a paired coupling means including a motor half coupling secured to said hollow motor shaft and having a self-aligning tapered recess therein and further including a pump half coupling secured to said pump shaft and having a tapered conical projection thereon for precise mating engagement with said tapered recess to provide a rigid and aligned cantilevered support for said pump shaft relative to said motor shaft;
- a drive pin means arranged to rotationally secure said pump half coupling to said motor half coupling, said drive pin means being spring biased to extend said drive pin into engagement with complementary bore means whereby exact angular relationship is unnecessary when replacing said motor unit and said drive pin means will automatically seat in said related bore means upon initial relative motion between coupling halves;
- a drawbar means extending through said hollow motor shaft and into threaded engagement with said pump half coupling to axially secure said pump half coupling to said motor half coupling and having a torque transmitting head thereon protruding from said hollow motor shaft, being accessible to said remotely operated equipment to selectively connect or disconnect said motor half coupling from said pump half coupling;
- a plurality of elongated hold down bolts arranged to secure said frame to said base plate, each of said hold down bolts having a torque transmitting head portion protruding from said frame and being accessible, whereby said remotely operated equipment may be employed to selectively tighten down or release said motor unit frame from said base plate for replacement of said motor of said motor unit in said area of high radiation; and
- said motor unit frame including a top plate and a bottom plate being interconnected by a plurality of tube members through which said plurality of elongated hold down bolts extend and which are turned down into related threaded bores in said base plate.

7. The pump/motor assembly of claim 6, wherein said motor unit frame includes a sub-base plate secured to said bottom plate and having a pair of circumferentially perforated ears secured thereto, and wherein said base plate includes a pair of spaced, upwardly extending locating dowel pins arranged to be received in said perforations of said ears whereby said plurality of elongated hold down bolts are placed in register with said related threaded bores in said base plate.

8. A pump/motor assembly arranged to operate in an area of high radiation in which the motor portion of the assembly is replaceable with the use of remotely operated equipment, comprising:
- a pimp unit mounted in said area on a first surface of a base plate and including a pump shaft;
- a motor unit having a frame carrying a motor thereon and being mounted on a second surface of said base plate, said motor having a hollow motor shaft;
- a paired coupling means including a motor half coupling secured to said hollow motor shaft and having a self aligning tapered recess therein and further including a pump half coupling secured to said pump shaft and having a tapered conical projection thereon for precise mating engagement with said tapered recess to provide a rigid and aligned cantilevered support for said pump shaft relative to said motor shaft;
- a drive pin means arranged to rotationally secure said pump half coupling to said motor half coupling, said drive pin means being spring biased to extend said drive pins into engagement with complementary bore means whereby exact angular relationship is unnecessary when replacing said motor unit and said drive pin means will automatically seat in said related bore means upon initial relative motion between coupling halves;
- a drawbar means extending through said hollow motor shaft and into threaded engagement with said pump half coupling to axially secure said pump half coupling to said motor half coupling and having a torque transmitting head thereon protruding from said hollow motor shaft, being accessible to said remotely operated equipment to selectively connect or disconnect said motor half coupling from said pump half coupling;
- a plurality of elongated hold down bolts arranged to secure said frame to said base plate, each of said hold down bolts having a torque transmitting head portion protruding from said frame and being accessible, whereby said remotely operated equipment may be employed to selectively tighten down or release said motor unit frame from said base plate for replacement of said motor unit in said area of high radiation;
- said pump shaft being maintained in aligned vertical orientation by a bushing while awaiting the mating of said coupling halves, and
- said bushing having a small clearance relative to said pump shaft when said coupling halves are rigidly interconnected.

9. A pump/motor assembly arranged to operate in an area of high radiation in which the motor portion of the assembly is replaceable with the use of remotely operated equipment, comprising:
- a pump unit mounted in said area on a first surface of a base plate and including a pump shaft;
- a motor unit having a frame carrying a motor thereon and being mounted on a second surface of said base plate, said motor having a hollow motor shaft;
- a paired coupling means including a motor half coupling secured to said hollow motor shaft and having a self aligning tapered recess therein and further including a pump half coupling secured to said pump shaft and having a tapered conical projection thereon for precise mating engagement with said tapered recess to provide a rigid and aligned cantilevered support for said pump shaft relative to said motor shaft;
- a drive pin means arranged to rotationally secure said pump half coupling to said motor half coupling, said drive pin means being spring biased to extend said drive pins into engagement with complementary bore means whereby exact angular relationship is unnecessary when replacing said motor unit and said drive pin means will automatically seat in said related bore means upon initial relative motion between coupling halves;

a drawbar means extending through said hollow motor shaft and into threaded engagement with said pump half coupling to axially secure said pump half coupling to said motor half coupling and having a torque transmitting head thereon protruding from said hollow motor shaft, being accessible to said remotely operated equipment to selectively connect or disconnect said motor half coupling from said pump half coupling;

a plurality of elongated hold down bolts arranged to secure said frame to said base plate, each of said hold down bolts having a torque transmitting head portion protruding from said frame and being accessible, whereby said remotely operated equipment may be employed to selectively tighten down or release said motor unit frame from said base plate for replacement of said motor unit in said area of high radiation;

said hollow motor shaft including a slotted disc secured to an upper end thereof and being, adapted to coact with said torque transmitting head of said drawbar whereby said remotely operated equipment is effective to apply full torque thereto, selectively to tighten down said drawbar into said pump half coupling or to release said drawbar therefrom.

10. A pump/motor assembly arranged to operate in an area of high radiation in which the motor portion of the assembly is replaceable with the use of remotely operated equipment, comprising:

a pump unit mounted in said area on a first surface of a base plate and including a pump shaft;

a motor unit having a frame carrying a motor thereon and being mounted on a second surface of said base plate, said motor having a hollow motor shaft;

a paired coupling means including a motor half coupling secured to said hollow motor shaft and having a self aligning tapered recess therein and further including a pump half coupling secured to said pump shaft and having a tapered conical projection thereon for precise mating engagement with said tapered recess to provide a rigid and aligned cantilevered support for said pump shaft relative to said motor shaft;

a drive pin means arranged to rotationally secure said pump half coupling to said motor half coupling, said drive pin means being spring biased to extend said drive pin into engagement with complementary bore means whereby exact angular relationship is unnecessary when replacing said motor unit and said drive pin means will automatically seat in said related bore means upon initial relative motion between coupling halves;

a drawbar means extending through said hollow motor shaft and into threaded engagement with said pump half coupling to axially secure said pump half coupling to said motor half coupling and having a torque transmitting head thereon protruding from said hollow operated equipment to selectively connect or disconnect said motor half coupling from said pump half coupling;

a plurality of elongated hold down bolts arranged to secure said frame to said base plate, each of said hold down bolts having a torque transmitting head portion protruding from said frame and being accessible, whereby said remotely operated equipment may be employed to selectively tighten down or release said motor unit frame from said base plate for replacement of said motor unit in said area of high radiation;

a slotted plate being operably associated with each of said plurality of hold down bolts, and being adapted to coact with said torque transmitting head of said hold down bolts whereby said remotely operated equipment is effective to apply full torque thereto to selectively tighten down said motor unit to said base plate or release said motor unit therefrom.

* * * * *